US011465778B2

(12) United States Patent
Megchiani et al.

(10) Patent No.: US 11,465,778 B2
(45) Date of Patent: Oct. 11, 2022

(54) PUMP MANAGEMENT SYSTEM

(71) Applicant: The Boeing Company, Chicago, IL (US)

(72) Inventors: Chetan B. Megchiani, Bothell, WA (US); Robert Leitch, Vancouver (CA); Yikan Wang, Vancouver (CA)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 16/808,919

(22) Filed: Mar. 4, 2020

(65) Prior Publication Data
US 2021/0277906 A1 Sep. 9, 2021

(51) Int. Cl.
| | |
|---|---|
| B64F 5/40 | (2017.01) |
| F04D 27/00 | (2006.01) |
| F04D 25/16 | (2006.01) |
| B64F 5/60 | (2017.01) |
| B64D 45/00 | (2006.01) |
| G07C 3/00 | (2006.01) |
| G07C 5/00 | (2006.01) |
| B64D 13/06 | (2006.01) |

(52) U.S. Cl.
CPC ............... *B64F 5/40* (2017.01); *B64D 45/00* (2013.01); *B64F 5/60* (2017.01); *F04D 25/16* (2013.01); *F04D 27/001* (2013.01); *G07C 3/00* (2013.01); *G07C 5/006* (2013.01); *B64D 2013/0674* (2013.01); *B64D 2045/0085* (2013.01); *F05B 2220/10* (2013.01); *F05D 2260/80* (2013.01); *F05D 2260/821* (2013.01); *F05D 2260/84* (2013.01); *F05D 2270/46* (2013.01)

(58) Field of Classification Search
CPC ... B64F 5/40; B64F 5/60; B64D 45/00; F04D 25/16; F04D 27/001; G07C 3/00; G07C 5/006
See application file for complete search history.

(56) References Cited

U.S. PATENT DOCUMENTS

| | | | | |
|---|---|---|---|---|
| 6,832,504 B1* | 12/2004 | Birkmann | ........... | G01M 3/3227 340/605 |
| 2010/0126189 A1* | 5/2010 | Soenmez | .................. | B64F 5/40 62/77 |
| 2010/0305826 A1* | 12/2010 | Fernandez | ............. | B64D 31/12 701/99 |
| 2018/0266584 A1* | 9/2018 | Sundareswara | ........ | G06Q 10/20 |
| 2019/0385386 A1* | 12/2019 | Davidson | ............... | G07C 5/085 |
| 2021/0034581 A1* | 2/2021 | Boven | ..................... | G06F 9/541 |

\* cited by examiner

*Primary Examiner* — Michael D Lang
(74) *Attorney, Agent, or Firm* — Yee & Associates. P.C.

(57) ABSTRACT

A method, apparatus, system, and computer program product for managing pumps in an aircraft. Flight information about an operation of the pumps in a pump package in the aircraft is received by a computer system. The flight information is received from the aircraft. A number of times that an abnormal switching occurred for the pumps within a window of consecutive flights is determined by the computer system when the abnormal switching is identified from the flight information. A set of actions is performed by the computer system when the abnormal switching occurred a number of times for the pumps within the window of consecutive flights that exceeds a set of thresholds for the abnormal switching that is considered healthy for the pumps.

27 Claims, 12 Drawing Sheets

PUMP MANAGEMENT SYSTEM

BACKGROUND INFORMATION

1. Field

The present disclosure relates generally to aircraft and, in particular, to maintaining aircraft systems. Still more particularly, the present disclosure relates to a method, apparatus, and system for predicting when a pump may no longer perform within specifications in a cooling system in an aircraft.

2. Background

In an aircraft, cooling systems are present to provide cooling to various heat loads in the aircraft. For example, cooling systems can be used to provide cooling to galleys in an aircraft to keep food and beverages cool. As another example, the cooling systems can be used to provide cooling in a cargo compartment of the aircraft. In yet another illustrative example, the cooling systems can provide cooling for electronics within the aircraft.

Maintenance is performed on various components in the cooling system from time to time such that the cooling systems can provide a temperature-controlled environment for these and other areas of the aircraft. Performing maintenance for replacement at a desired time can be challenging depending on the ability to determine when such maintenance or replacement is needed.

Therefore, it would be desirable to have a method and apparatus that take into account at least some of the issues discussed above, as well as of possible issues. For example, it would be desirable to have a method and apparatus that overcome a technical problem with maintaining a cooling system in aircraft.

SUMMARY

An embodiment of the present disclosure provides a method for managing pumps in an aircraft. Flight information about an operation of the pumps in a pump package in the aircraft is received by a computer system. The flight information is received from the aircraft. A number of times that an abnormal switching occurred for the pumps within a window of consecutive flights is determined by the computer system when the abnormal switching is identified from the flight information. A set of actions is performed by the computer system when the abnormal switching occurred the number of times for the pumps within the window of consecutive flights that exceeds a set of thresholds for the abnormal switching that is considered healthy for the pumps.

Another embodiment of the present invention provides a pump management system comprising a computer system and a system manager in the computer system. The manager operates to receive flight information about an operation of the pumps in a pump package in an aircraft, wherein the flight information is received from the aircraft. The system manager operates to determine a number of times that an abnormal switching occurred for the pumps within a window of consecutive flights when the abnormal switching is identified from the flight information. The system manager operates to perform a set of actions when the abnormal switching occurred a number of times for the pumps within the window of consecutive flights that exceeds a set of thresholds for the abnormal switching that is considered healthy for the pumps.

Yet another embodiment of the present invention provides a pump management system comprising a computer system and a system manager in the computer system. The system manager operates to receive vehicle use information about an operation of the pumps in a pump package in a vehicle, wherein the vehicle use information is received from the vehicle. The system manager operates to determine a number of times that an abnormal switching occurred for the pumps within a window of consecutive uses of the vehicle when the abnormal switching is identified from the vehicle use information. The system manager operates to perform a set of actions when the abnormal switching occurred a number of times for the pumps within the window of consecutive uses of the vehicle that exceeds a set of thresholds for the abnormal switching that is considered healthy for the pumps.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it is desirable to perform maintenance on an aircraft system prior to the aircraft system registering a nonconformance mode and potentially requiring a delay or cancellation of a flight. The illustrative embodiments also recognize and take into account that a higher than desired failure rate of cooling systems in aircraft can impose an economic burden on an airline and its operations.

The illustrative embodiments also recognize and take into account that it is desirable to perform maintenance on an aircraft system in a manner that reduces the amount of maintenance, but in a manner that avoids a nonconformance of the aircraft system. The illustrative embodiments also recognize and take into account that it is desirable to reduce repair costs for an aircraft system by early failure detection.

The illustrative embodiments recognize and take into account that with sufficient early detection, maintenance can be performed on pumps in a cooling system such that interruptions in the normal schedule of flight and maintenance of aircraft can occur without being interrupted. For example, the illustrative embodiments recognize and take into account with sufficient notice that spare pumps can be shipped and positioned in locations along the normal routes of aircraft to reduce maintenance time and unavailability of aircraft.

A method, apparatus, system, and computer program product for managing pumps in an aircraft is presented. Flight information about an operation of the pumps in a pump package in the aircraft is received by a computer system. The flight information is received from the aircraft. A number of times that an abnormal switching occurred for the pumps within a window of consecutive flights is determined by the computer system when the abnormal switching is identified from the flight information. A set of actions is performed by the computer system when the abnormal switching occurred a number of times for the pumps within the window of consecutive flights that exceeds a set of thresholds for the abnormal switching that is considered healthy for the pumps.

Figure 1:
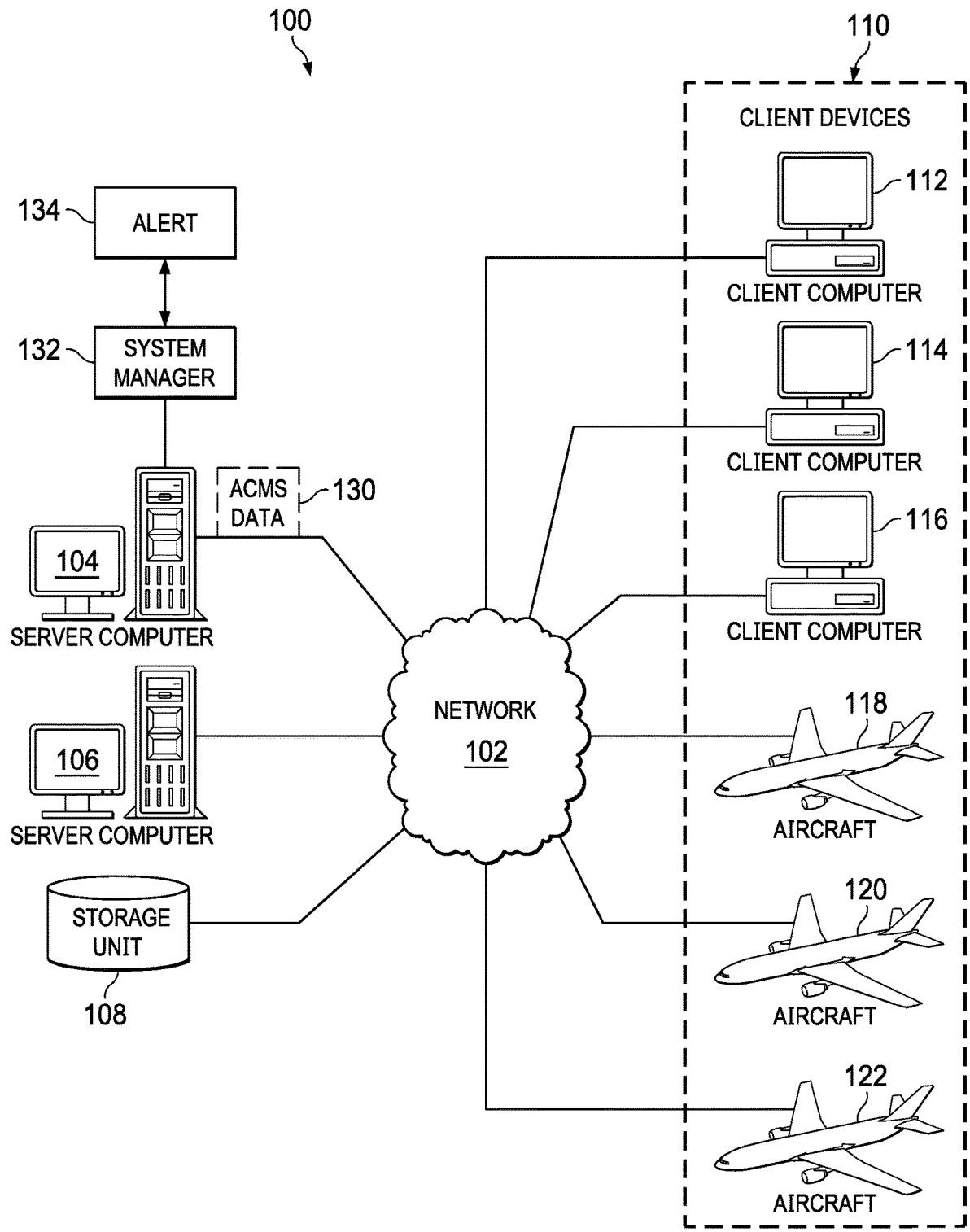
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as aircraft 118, aircraft 120, and aircraft 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, aircraft 118, aircraft 120, and aircraft 122 include cooling systems that are used to cool various areas in the aircraft. These cooling systems utilize pumps that move or circulate liquid for use in cooling different areas. As depicted, these aircraft can send airplane condition monitoring system (ACMS) data 130 to system manager 132 in server computer 104. This data can be generated by currently available monitoring systems in the aircraft. These monitoring systems include, for example, aircraft condition monitoring systems (ACMSs).

In some illustrative examples, system manager 132 can be located in aircraft 118, aircraft 120, and aircraft 122 and analyze airplane condition monitoring system (ACMS) data 130 onboard the aircraft. In yet other examples, system manager 132 can be distributed between server computer 104 and server computer 106 to provide load-balancing. In still other illustrative examples, system manager 132 can be distributed between server computer 104 and in computer systems in aircraft 118, aircraft 120, and aircraft 122.

An aircraft condition monitoring system is a hardware system in an aircraft that monitors sensor parameters in the aircraft. This system can collect sensor data from sensors for different aircraft systems in the aircraft during different phases of flight such as during takeoff and cruise phases of flight.

Airplane condition monitoring system (ACMS) data 130 can be received from aircraft condition monitoring systems in aircraft 118, aircraft 120, and aircraft 122 at different times. For example, airplane condition monitoring system (ACMS) data 130 can be received during at least one of after the flight of the aircraft or during the flight of the aircraft.

In this illustrative example, airplane condition monitoring system (ACMS) data 130 can be analyzed by system manager 132 on a per-flight basis for each of the aircraft.

In other words, system manager 132 can organize airplane condition monitoring system (ACMS) data 130 from the different aircraft into groups based on flights of the aircraft. In other illustrative examples, airplane condition monitoring system data 130 can be grouped based on some number of flights such as every two flights, every five flights, or some other number of flights of the aircraft.

In this illustrative example, system manager 132 can analyze switching information determined from flight information received from the aircraft. This flight information can be, for example, airplane condition monitoring system (ACMS) data 130. The flight information can indicate which pumps in a pump package operated during the flight of aircraft. The flight information can be determined from the data for the pumps received in airplane condition monitoring system (ACMS) data 130.

If the analysis indicates that abnormal switching activity is present at a level that indicates an undesired degradation in one or more pumps, alert 134 can be generated. Alert 134 is an example of an action that can be performed by system manager 132 when an abnormal event in pump switching indicates that a pump failure may occur within some period of time. For example, alert 134 can be generated when the abnormal switching occurred a number of times for the pumps within the window of consecutive flights that exceeds a set of thresholds for the abnormal switching that is considered healthy for the pumps.

If alert 134 is generated for one of aircraft 118, aircraft 120, or aircraft 122, maintenance can be scheduled for the aircraft for which alert 134 has been generated. This maintenance can be scheduled by system manager 132 or some other suitable process.

Thus, alert 134 can indicate that a pump in an aircraft for which the alert is generated has failed. In this illustrative example, a pump is considered to have failed when the pump is at least one of not performing within specification, in a degrading state, or non-operational. The alert can be generated to provide sufficient time to schedule maintenance for the aircraft in a manner that reduces impact on availability of the aircraft for use in aircraft operations such as transporting at least one of passengers or cargo.

Figure 2:
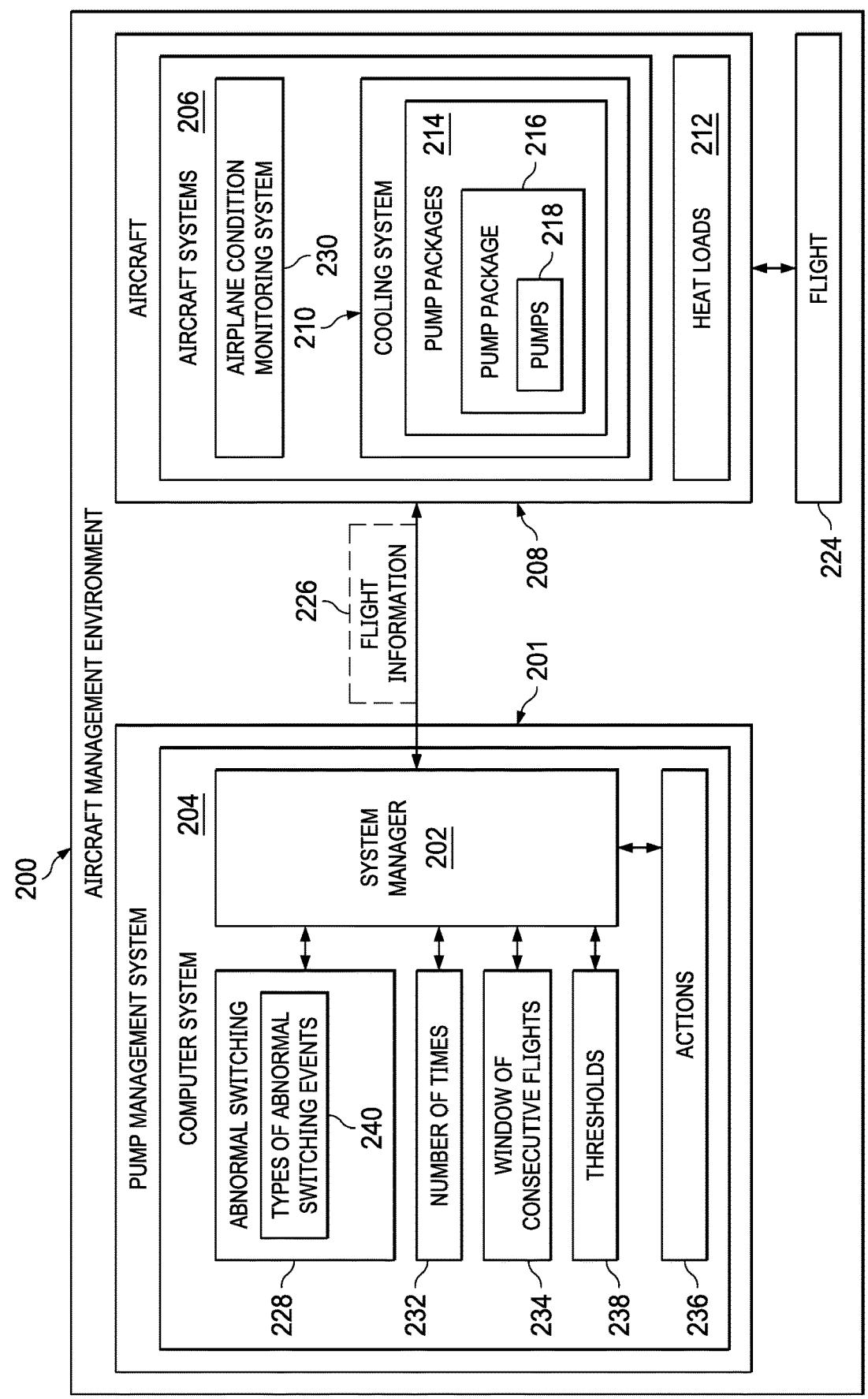
FIG. 2 is an illustration of a block diagram of an aircraft management environment in accordance with an illustrative embodiment.

With reference now to FIG. 2, an illustration of a block diagram of an aircraft management environment is depicted in accordance with an illustrative embodiment. In this illustrative example, aircraft management environment 200 includes components that can be implemented in hardware such as the hardware shown in network data processing system 100 in FIG. 1.

In this illustrative example, aircraft management environment 200 includes pump management system 201. In this example, pump management system 201 comprises system manager 202 and computer system 204. System manager 202 is located in computer system 204. As depicted, system manager 202 operates to manage maintenance for aircraft systems 206 in aircraft 208.

System manager 202 can be implemented in software, hardware, firmware, or a combination thereof. When software is used, the operations performed by system manager 202 can be implemented in program code configured to run on hardware, such as a processor unit. When firmware is used, the operations performed by system manager 202 can be implemented in program code and data and stored in persistent memory to run on a processor unit. When hardware is employed, the hardware can include circuits that operate to perform the operations in system manager 202.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system. Computer system 204 can be located in a least one of aircraft 208, a ground location, or some other suitable location.

In this illustrative example, aircraft systems 206 include cooling system 210. Cooling system 210 can provide cooling to heat loads 212 within aircraft 208. Heat loads 212 can include at least one of a cargo compartment, a galley, an avionics system, or some other component or location in aircraft 208 that may need cooling.

A set of pump packages 214 pumps a liquid within cooling system 210. In this illustrative example, pump package 216 in the set of pump packages 214 is a physical component and comprises pumps 218. Pumps 218 are one or more pumps in pump package 214 that are redundant units. In this illustrative example, pump package 216 pumps the fluid to provide cooling for heat loads 212.

In this illustrative example, system manager 202 can operate to manage cooling system 210. For example, system manager 202 can determine when pumps 218 in pump package 216 no longer operate as desired per specifications for pumps 218. For example, pumps 218 are redundant to each other. Switching can normally occur between pumps 218 for flight 224 of aircraft 208. In this illustrative example, flight 224 is the time from engine start to engine stop for aircraft 208. In this illustrative example, switching can occur anytime aircraft 208 is operating even if aircraft 208 is on the ground.

As depicted, system manager 202 can receive flight information 226 about the operation of pumps 218 in pump package 216. In this illustrative example, flight information 226 can be received at a time selected from at least one of after flight 224 of aircraft 208, during flight 224 of aircraft 208, or some other suitable time. In one illustrative example, flight information 226 can be airplane condition monitoring system (ACMS) data currently received from airplane condition monitoring system 230 in aircraft systems 206.

In this illustrative example, flight information 226 includes information about the operation of pumps 218. As depicted, the information is about switching between pumps 218 in pump package 216. For example, flight information 226 can include a speed of pumps 218. The speed of pumps 218 can be used to determine which ones of pumps 218 operated during a flight and when switching between pumps 218 has occurred. The speed of pumps 218 can be in revolutions per minute. When the revolutions per minute are greater than a threshold, a pump is considered to be operating. For example, the threshold can be greater than zero revolutions per minute.

System manager 202 can analyze flight information 226 to identify abnormal switching 228. In this illustrative example, system manager 202 can determine number of times 232 that abnormal switching 228 occurred for pumps 218 within window of consecutive flights 234 when abnormal switching 228 is identified from flight information 226.

In this illustrative example, system manager 202 can perform a set of actions 236 when abnormal switching 228 occurred number of times 232 for pumps 218 within window of consecutive flights 234 that exceeds a set of thresholds 238 for abnormal switching 228 that is considered healthy for pumps 218. The set of actions 236 can take a number of different forms. For example, the set of actions 236 can be selected from at least one of generating an alert, sending a message, scheduling maintenance, or some other suitable action.

In the illustrative example, abnormal switching 228 is present when switching occurs between pumps 218 that is not within normal operation of pumps 218. Some abnormal switching can occur because of the operation of other systems within aircraft systems 206. This type of abnormal switching can be considered healthy for pumps 218 because abnormal switching 228 is not caused by at least one of degradation or other issues with respect to pumps 218. For example, power transfers and changes in loading within aircraft systems 206 can cause abnormal switching 228 even though pumps 218 are healthy.

In this illustrative example, in analyzing flight information 226 to determine abnormal switching 228, system manager 202 can determine number of times 232 that abnormal switching 228 in the form of a set of types of abnormal switching events 240 occurred for pumps 218 within window of consecutive flights 234 when abnormal switching 228 is identified from flight information 226.

Figure 3:
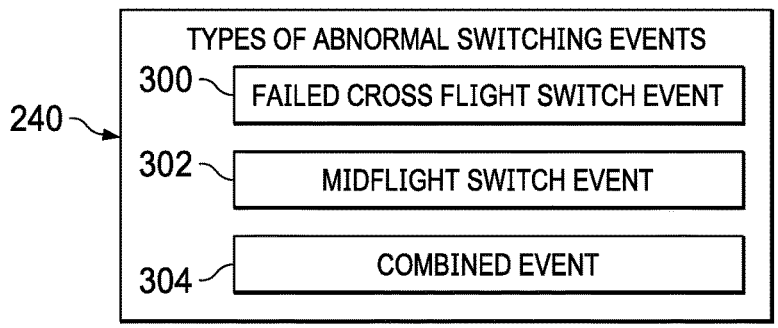
FIG. 3 is an illustration of types of abnormal switching events in accordance with an illustrative embodiment.

With reference next FIG. 3, an illustration of types of abnormal switching events is depicted in accordance with an illustrative embodiment. In the illustrative examples, the same reference numeral may be used in more than one figure. This reuse of a reference numeral in different figures represents the same element in the different figures.

Types of abnormal switching events 240 can take a number of different forms. As depicted in this illustrative example, types of abnormal switching events 240 include abnormal switching events selected from at least one of failed cross flight switch event 300, midflight switch event 302, or combined event 304. These illustrative examples of abnormal switching events are examples of abnormal switching events that may be correlated with pump failures.

In this illustrative example, normal operation of pumps 218 in pump package 216 involves a first pump in pumps 218 operating during the flight and switching to a second pump in pumps 218 for the next flight. This pattern can repeat. The switch typically occurs at the end of a flight shortly after the aircraft lands. In this illustrative example, the operation of the pumps can be inferred from flight information such as the speed for pumps 218 during the flight. A nonoperating pump will have a speed of zero while the operating pump will have a non-zero speed. In the illustrative example, an abnormal switching event occurs when a pump switch occurs or does not occur as expected between flights.

In this illustrative example, failed cross flight switch event 300 can occur when an expected switch between pumps 218 between flights fails to occur. With failed cross flight switch event 300, the same pump operates for two or more consecutive flights without an unexpected pump switch occurring.

Midflight switch event 302 can occur when a switch between pumps 218 occurs during flight 224 of aircraft 208. With this type of abnormal switching event, pump operation switches from one pump to another pump in a pump package during the flight. For example, switching can occur during a cruise phase of flight. This type of switch is an unexpected switch between pumps outside of the expected post-flight swap of pumps.

Combined event 304 is an event in which both failed cross flight switch event 300 and midflight switch event 302 occur. With this abnormal switching event, a pump switch does not occur between flights while the pump switch occurs during the flight.

Figure 4:
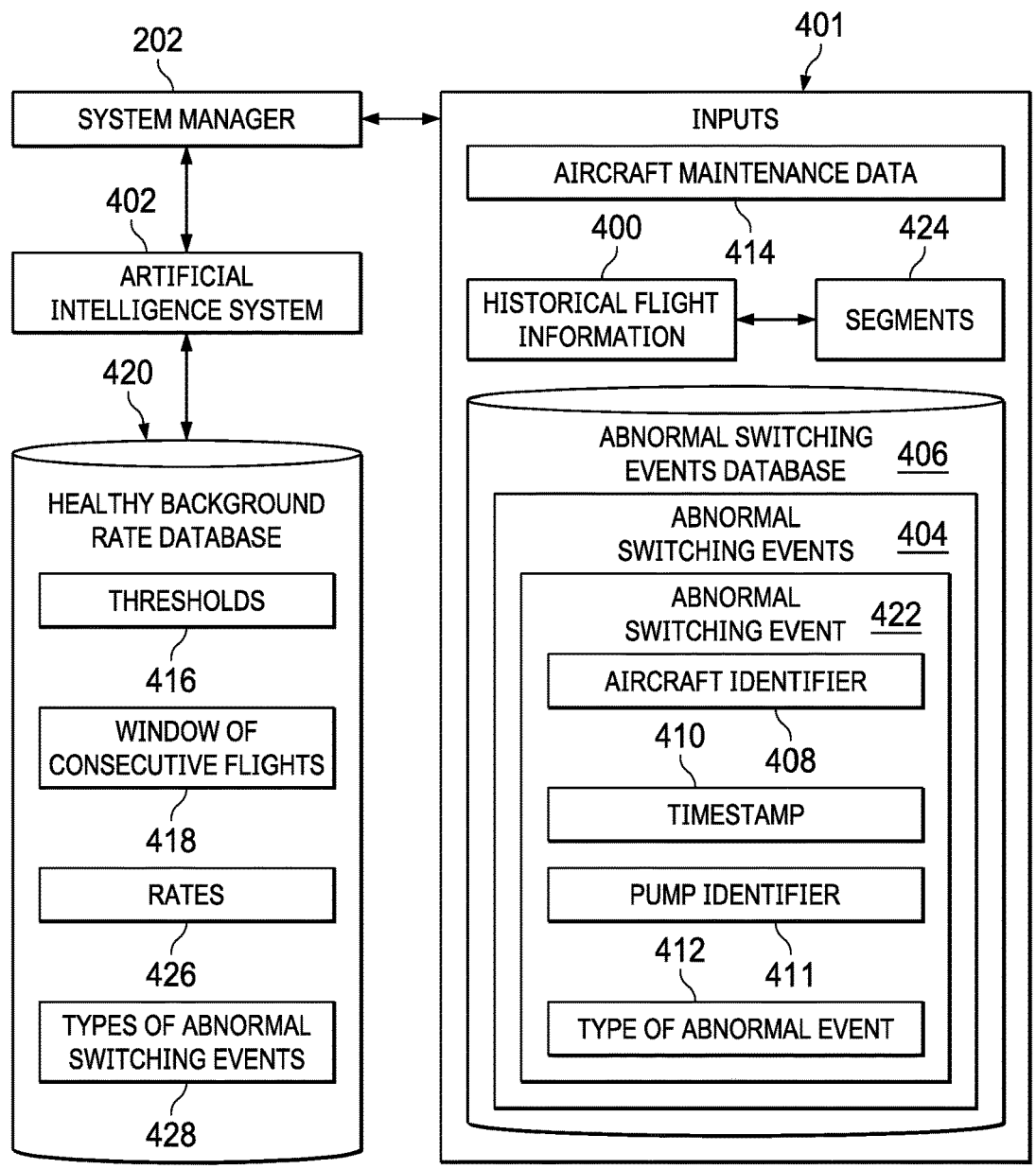
FIG. 4 is an illustration of a block diagram for determining healthy background abnormal switching rates in accordance with an illustrative embodiment.

Turning next to FIG. 4, an illustration of a block diagram for determining healthy background abnormal switching rates is depicted in accordance with an illustrative embodiment. In this illustrative example, system manager 202 can perform an analysis on historical flight information 400 from aircraft flights. Historical flight information 400 can be obtained from prior flights of a set of aircraft. The set of aircraft may include aircraft 208 in FIG. 2. In other illustrative examples, the set of aircraft may be aircraft 208 as well as other aircraft. In other illustrative examples, the set of aircraft may be aircraft other than aircraft 208.

In some illustrative examples, system manager 202 uses artificial intelligence system 402 in performing analysis of historical flight information 400. This analysis can be performed to determine when pumps were healthy in historical flight information 400.

In this illustrative example, artificial intelligence system 402 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system. Machine learning model in artificial intelligence system 402 can be trained to determine when abnormal switching events are greater than a background rate for healthy operation of the pumps.

As depicted, artificial intelligence system 402 can include a number of artificial intelligence models including one or more machine learning models. A machine learning model is a type of artificial intelligence model that can learn without being explicitly programmed. A machine learning model can learn based on data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

As depicted, artificial intelligence system 402 can perform historical flight analysis on historical flight information 400. This analysis can be performed to detect events such as abnormal switching events 404 in historical flight information 400.

System manager 202 can determine types of abnormal switching events 404 present in historical flight information 400 and label those abnormal switching events with the types determined for them. In this manner, system manager 202 can create abnormal switching event database 406 from analyzing and labeling historical flight information 400. In this illustrative example, abnormal switching event database 406 comprises abnormal switching events 404 from historical flight information 400. For example, abnormal switching event 422 in abnormal switching events 404 can include aircraft identifier 408, timestamp 410, pump identifier 411, and type of abnormal event 412.

As depicted, aircraft identifier 408 can be a tail number or some other identification of the aircraft. Pump identifier 411 can be used uniquely identify the pump in the aircraft. Pump identifier 411 can be, for example, a serial number. Further, pump identifier 411 can also be used to identify the location of the product and the pump package in which the pump is located.

Timestamp 410 identifies the data in time when the abnormal switching event occurred. Further, type of abnormal event 412 indicates a type of abnormal switching event that occurred.

With abnormal switching event database 406 and historical flight information 400, system manager 202 can train artificial intelligence system 402 to distinguish between abnormal switching events occurring when the pumps in a pump package are healthy and when abnormal switching events occur indicating that the pumps are degrading and a pump failure will occur. This training can be performed using inputs 401, which include aircraft maintenance data 414, historical flight information 400, and abnormal switching events database 406.

In this illustrative example, historical flight information 400 can be segmented by system manager 202 into segments 424 in which a segment represents a continuous period of time. In the depicted example, a segment begins when a pump package is installed or replaced. Identifying segments 424 in historical flight information 400 can be performed by system manager 202 using aircraft maintenance data 414. This data can identify when maintenance is performed on pumps in the aircraft. Aircraft maintenance data 414 can also indicate whether a pump removed for maintenance had failed.

This segment extends until a pump in the pump package is subsequently removed. The removal of the pump can be to perform maintenance on the pump or to replace the pump with a new pump. The same pump can be returned after maintenance depending on the particular implementation. Removal of a pump may occur for at least one of inspection, replacement, or repair of a pump. The replacement of a pump means that the pump is replaced with a new or refurbished pump. The segmentation is made such that artificial intelligence 402 is aware of pump removals or replacements.

The identification of when pumps failed in aircraft maintenance data 414 can be used by artificial intelligence system 402 along with abnormal switching events database 406 and historical flight information 400 in segmented form to train artificial intelligence system 402 to determine when abnormal switching events 404 deviate from a healthy background rate of abnormal switching events 404. In other words, some background rate of abnormal switching events 404 can occur without pump failure.

In this illustrative example, artificial intelligence system 402 can determine a set of thresholds 416, which can be used to determine when abnormal switching events 404 are no longer occurring at a background rate for healthy pumps. The set of thresholds 416 are examples of the set of thresholds 238 in FIG. 2. The set of thresholds 416 can be used to determine when a healthy background abnormal switching rate is present versus an unhealthy switching rate.

In the illustrative example, a threshold in the set of thresholds 416 can be associated with a particular type of abnormal switching event. As a result, each type of abnormal switching event can have a separate threshold in the set of thresholds 416. In other illustrative examples, a single threshold may be used for all types of abnormal switching events.

In this illustrative example, artificial intelligence 402 can also determine window of consecutive flights 418 for use in determining whether abnormal switching events 404 exceed the set of thresholds 416 for abnormal switching that is considered healthy for the pumps in a pump package.

In this illustrative example, the set of thresholds 416 and window of consecutive flights 418 can be internalized within artificial intelligence system 402. These components can be a part of healthy background rate database 420 for artificial intelligence system 402. In other illustrative examples, artificial intelligence system 402 can output healthy background rate database 420 with the set of thresholds 416 and window of consecutive flights 418.

In this illustrative example, healthy background rate database 420 includes rates 426 for types of abnormal switching events 428. Each type of abnormal switching event can be associated with the particular rate of abnormal switching that can occur within window of consecutive flights 418 in which the rate indicates that a pump is most likely operating at a desired level of performance even though abnormal switching events 404 have occurred. This rate can be used to determine the set of thresholds 416 for use in generating alerts that maintenance may be needed.

In this illustrative example, the particular threshold in the set of thresholds 416 used can vary depending on types of abnormal switching events 428 occurring. In other words, a different threshold can be present for each type of abnormal switching event. The set of thresholds 416 can be selected or configured to determine when to generate an event based on a confidence level that particular types of abnormal switching events do not match healthy behavior.

As a result, artificial intelligence system 402 can be used to strain or analyze flight information from aircraft. In other illustrative examples, the set of thresholds 416 and window of consecutive flights 418 can be output from artificial intelligence system 402 and used by other components such as system manager 202 to determine whether an alert should be generated because abnormal pump switching has exceeded a background rate for healthy pump switching.

In one illustrative example, one or more technical solutions are present that overcome a technical problem with maintaining cooling systems. As a result, one or more technical solutions can provide a technical effect of enabling scheduling of maintenance for the pumps in a cooling system in a manner that provides for at least one of least one of a reduced maintenance cost, a reduced repair cost, or an increased availability of aircraft.

Computer system 204 can be configured to perform at least one of the steps, operations, or actions described in the different illustrative examples using software, hardware, firmware, or a combination thereof. As a result, computer system 204 operates as a special purpose computer system in which system manager 202 and computer system 204 enables managing cooling systems in aircraft and other vehicles in the manner that reduces undesired or unexpected maintenance. System manager 202 transforms computer system 204 into a special purpose computer system as compared to currently available general computer systems that do not have system manager 202.

The illustration of aircraft management environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, pump package 216 in the set of pump packages 214 is described as being assigned to a fluid loop. When one or more fluid loops are present in addition to the fluid loop, other pump packages in the set of pump packages 214 can be assigned to pump fluid through those additional fluid loops. Further, in other illustrative examples, one or more pump packages in addition to pump package 216 can also be assigned to pump fluid through a fluid loop.

As another example, system manager 202 can be implemented to manage a vehicle other than aircraft 208. The vehicle can be selected from a group comprising a surface ship, a cargo ship, a submarine, a tank, a personnel carrier, a train, a refrigerated truck, a spacecraft, a bus, and other suitable vehicles. With vehicles, historical vehicle use information can be used instead of historical flight use information for analysis.

In yet another illustrative example, other types of flight information 226 can be used in addition to or in place of pump speed for pumps 218 to determine which one of pumps 218 operates when a pump switch occurs. For example, flight information 226 include at least one of a level of electrical current sent to a pump, a pump physician indicating which pump is active, or other suitable information.

Figure 5:
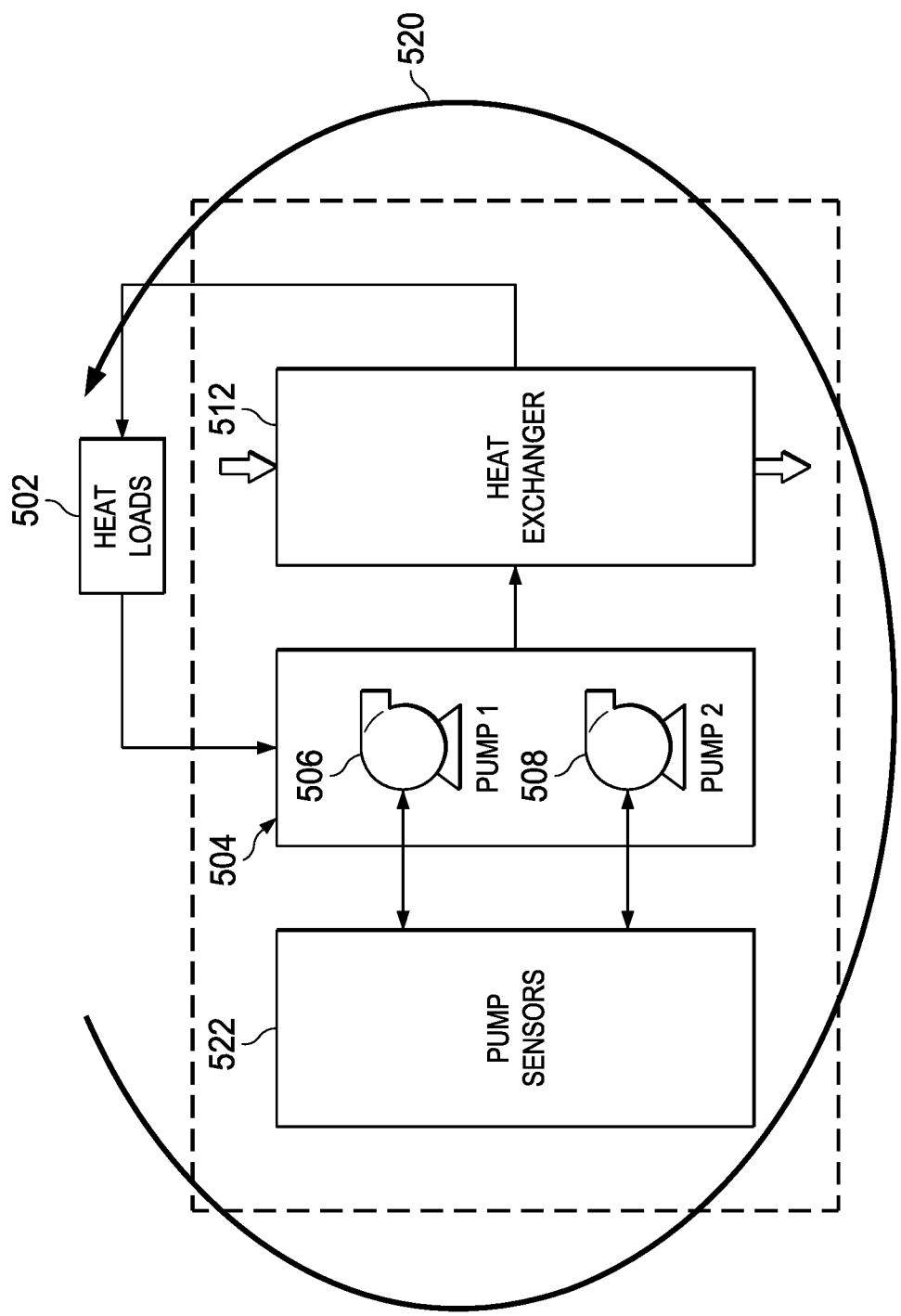
FIG. 5 is an illustration of a cooling system in accordance with an illustrative embodiment.

Turning next to FIG. 5, an illustration of a cooling system is depicted in accordance with an illustrative embodiment. As depicted, cooling system 500 is an example of one implementation for cooling system 210 shown in block form in FIG. 2.

In this illustrative example, cooling system 500 can operate to cool heat loads 502. In this illustrative example, cooling system 500 includes pump package 504. Pump package 504 contains pump 1 506 and pump 2 508. Cooling system also includes heat exchanger 512. Conduit system 514 connects the different components in cooling system 500 to each other and provides a connection to heat loads 502.

The pumps circulate a fluid through conduit system 514 in path 520 to cool heat loads 502. In cooling heat loads, the liquid becomes heated. As a liquid flows through heat exchanger 512, heat exchanger 512 removes heat from the liquid.

In this illustrative example, pump sensors 522 can detect the speed of pump 1 506 and pump 2 508 in pump package 504. Pump sensors 522 can be a part of an airplane condition monitoring system (ACMS) that generates airplane condition monitoring system data which can be analyzed to identify pump switching including abnormal pump switching between pump 1 506 and pump 2 508 in pump package 504.

The illustration of cooling system 500 in FIG. 5 is only meant to provide an example of one implementation for cooling system 210 in FIG. 2. In other illustrative examples, additional paths can be present in a cooling system. With additional paths, pump packages can be located in the additional paths to pump liquids through those additional paths. In still other illustrative examples, one or more pumps can be present in pump package 504 in addition to pump 1 506 and pump 2 508.

Figure 6:
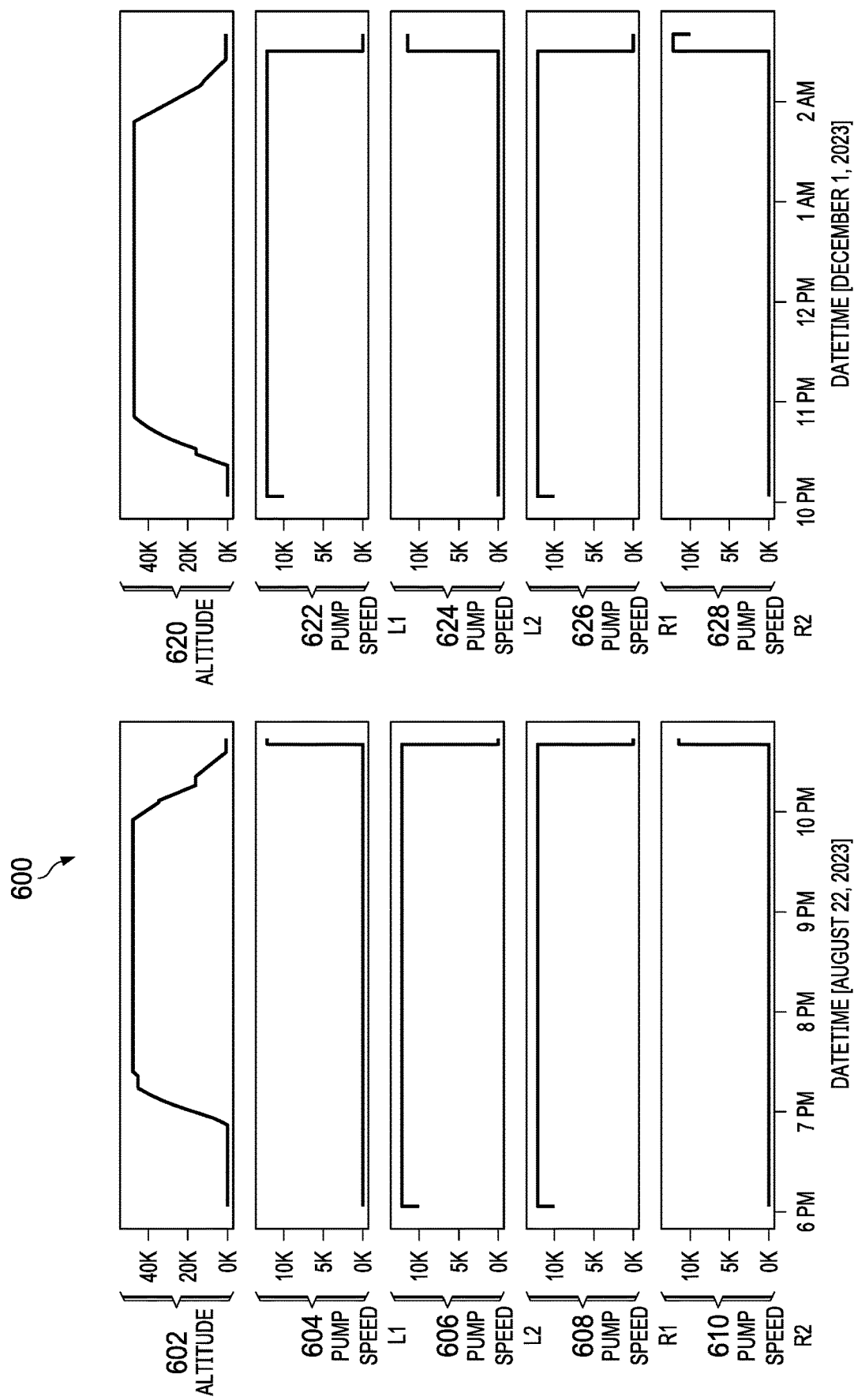
FIG. 6 is an illustration of flight information for a failed cross flight switch event in accordance with an illustrative embodiment.
Figure 7:
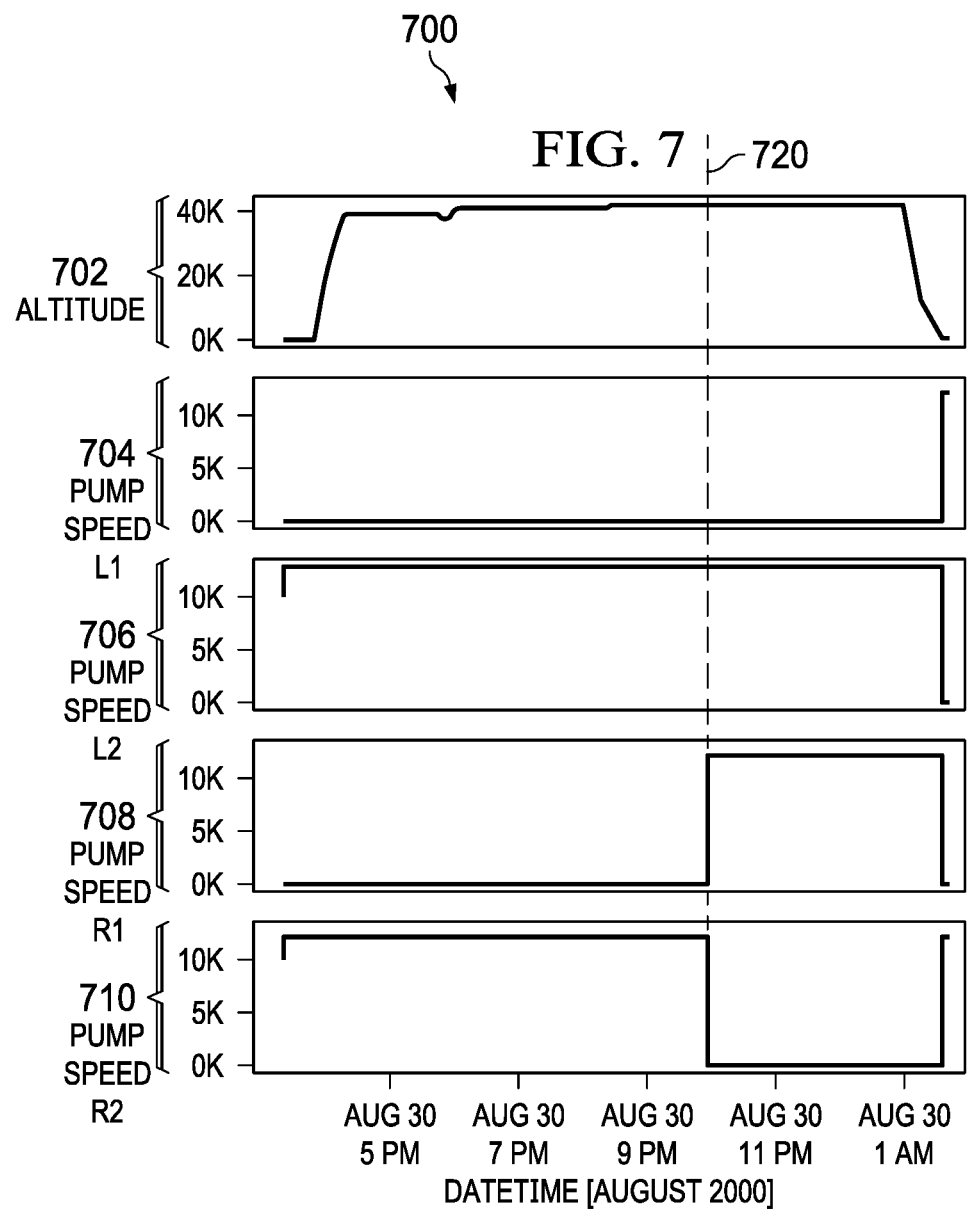
FIG. 7 is an illustration of flight information for a mid-flight switch event in accordance with an illustrative embodiment.
Figure 8:
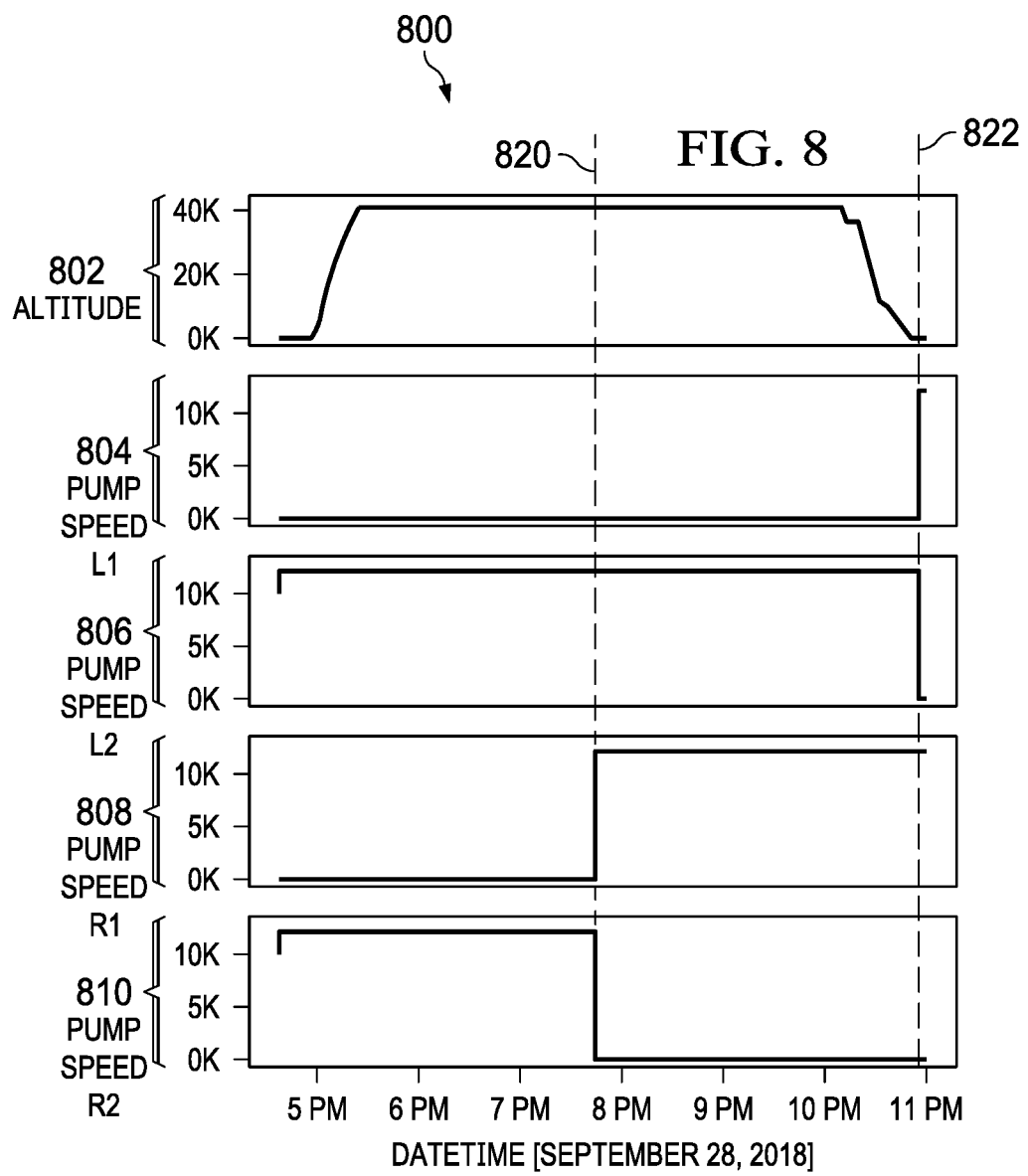
FIG. 8 is an illustration of flight information for a combined event in accordance with an illustrative embodiment.

FIGS. 6-8 illustrate flight information for different types of abnormal switching events. Turning first to FIG. 6, an illustration of flight information for a failed cross flight switch event is depicted in accordance with an illustrative embodiment. Graphs 600 illustrate flight information for a failed cross flight switch event such as failed cross flight switch event 300 in FIG. 3.

As depicted, graphs 600 include altitude 602, pump speed L1 604, pump speed L2 606, pump speed R1 608, and pump speed R2 610 for a first flight of an aircraft. As depicted, altitude 602 is a graph of altitude for the aircraft over time.

This information can be used to determine when an aircraft takes off and lands to define the time period for the first flight of the aircraft.

In this illustrative example, pump speed L1 604 and pump speed L2 606 are graphs of pump speeds for a first pump and a second pump in a first pump package for a cooling loop on a left side of an aircraft. Pump speed R1 608 and pump speed R2 610 are graphs of pump speeds for a first pump and a second pump in a second pump package on a right side of the aircraft. The pump speeds are in revolutions per minute over time.

In this illustrative example, graphs 600 also include altitude 620, pump speed L1 622, pump speed L2 624, pump speed R1 626, and pump speed R2 628 for a second subsequent flight of the aircraft. As depicted, altitude 620 is a graph of altitude for the aircraft and can be used to determine when an aircraft takes off and lands to define the time period for the second flight of the aircraft.

In this illustrative example, pump speed L1 622 and pump speed L2 624 are graphs of pump speeds for the two pumps in the first pump package on the left side of aircraft. Pump speed R1 626 and pump speed R2 628 are graphs of pump speeds for two pumps in the second pump package on the right side of the aircraft.

As depicted, pump speed R1 608 and pump speed R1 626 for the first pump in the first pump package show that a switch over between the first pump and the second pump do not occur between the two flights. The absence of the switch over can be determined from the pump speeds in which pump speed for pump R1 remains high for both flights as illustrated by pump speed R1 608, and pump speed R1 626 and pump speed for pump R2 remains at zero for both flights as illustrated pump speed R2 610 and pump speed R2 628 in graphs 600. As a result, a failed cross flight switch event has occurred in the second pump package.

In the illustrative example, pump speed L1 604 pumps speed L1 622, pump speed L2 606, and pump speed L2 624 show normal switching between pumps in the second pump package.

In FIG. 7, an illustration of flight information for a midflight switch event is depicted in accordance with an illustrative embodiment. Graphs 700 illustrate flight information for a midflight switch event such as midflight switch event 302 in FIG. 3.

In this illustrative example, graphs 700 include altitude 702, pump speed L1 704, pump speed L2 706, pump speed R1 708, and pump speed R2 710 for a flight of an aircraft. As depicted, altitude 702 is a graph of altitude for the aircraft over time. This information can be used to determine when an aircraft takes off and lands to define the time period for the flight of the aircraft.

In this illustrative example, pump speed L1 704 and pump speed L2 706 are graphs of pump speeds for a first pump and a second pump in a first pump package for a cooling loop on a left side of an aircraft. Pump speed R1 708 and pump speed R2 710 are graphs of pump speeds for a first pump and a second pump in a second pump package on a right side of the aircraft. The pump speeds are in revolutions per minute over time.

In this illustrative example, pump speed R1 708 and pump speed R2 710 show a switch over from the second pump to respond in the second pump package at time 720. This switch over between these pumps occurs during the flight of the aircraft and is an example of a midpoint switch event.

With reference to FIG. 8, an illustration of flight information for a combined event is depicted in accordance with an illustrative embodiment. Graphs 800 illustrate flight information for a combined event such as combined event 304 in FIG. 3.

In this illustrative example, graphs 800 include altitude 802, pump speed L1 804, pump speed L2 806, pump speed R1 808, and pump speed R2 810 for a flight of an aircraft. As depicted, altitude 802 is a graph of altitude for the aircraft over time. This information can be used to determine when an aircraft takes off and lands to define the time period for the flight of the aircraft.

In this illustrative example, pump speed L1 804 and pump speed L2 806 are graphs of pump speeds for a first pump and a second pump in a first pump package for a cooling loop on a left side of an aircraft. Pump speed R1 808 and pump speed R2 810 are graphs of pump speeds for a first pump and a second pump in a second pump package on a right side of the aircraft. The pump speeds are in revolutions per minute over time.

In this illustrative example, pump speed R1 808 and pump speed R2 810 shows a switch over from the second pump to respond in the second pump package at time 820. This switch over between these pumps occurs midflight and is an example of a midpoint switch event. Additionally, pump speed R1 808 and pump speed R2 810 show that a switch over between pump R1 and pump R2 does not occur at the end of the flight shown at time 822.

Thus, a combined event has occurred in which both a failed cross point switch event and a mid-switch event have occurred with respect to the first pump and the second pump in the second pump package on the right side of the aircraft.

The illustration of the graphs showing flight information for switching events in FIGS. 7-8 are presented for purposes of illustrating examples of flight information that can be used to detect the occurrence of abnormal switching events for an aircraft. These graphs are not meant to limit the manner in which this information may be determined. For example, at least one of pump sessions indicating which pump is operating or pump speed current can also be used to determine which pumps are operating during a flight.

Figure 9:
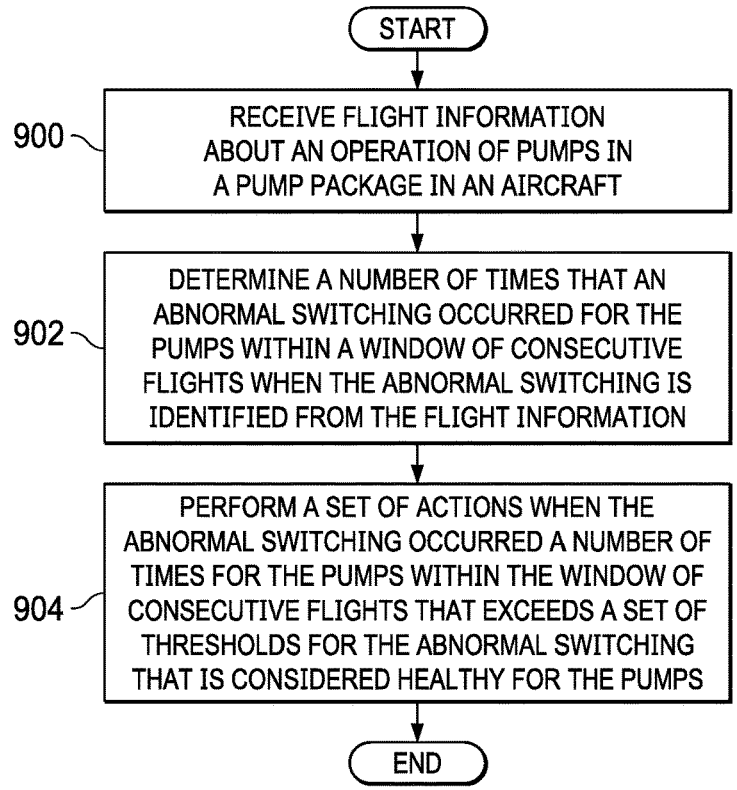
FIG. 9 is an illustration of a flowchart of a process for managing pumps in an aircraft in accordance with an illustrative embodiment.

Turning next to FIG. 9, an illustration of a flowchart of a process for managing pumps in an aircraft is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in system manager 202 in computer system 204 in FIG. 2.

The process begins by receiving flight information about an operation of pumps in a pump package in an aircraft (operation 900). In operation 900, the flight information is received from the aircraft. The process determines a number of times that an abnormal switching occurred for the pumps within a window of consecutive flights when the abnormal switching is identified from the flight information (operation 902).

The process performs a set of actions when the abnormal switching occurred a number of times for the pumps within the window of consecutive flights that exceeds a set of thresholds for the abnormal switching that is considered healthy for the pumps (operation 904). The process terminates thereafter. In operation 904, a threshold can be selected from a set of thresholds based on the type of abnormal switching event to determine whether the abnormal switching rate is a healthy or unhealthy abnormal switching rate.

Figure 10:
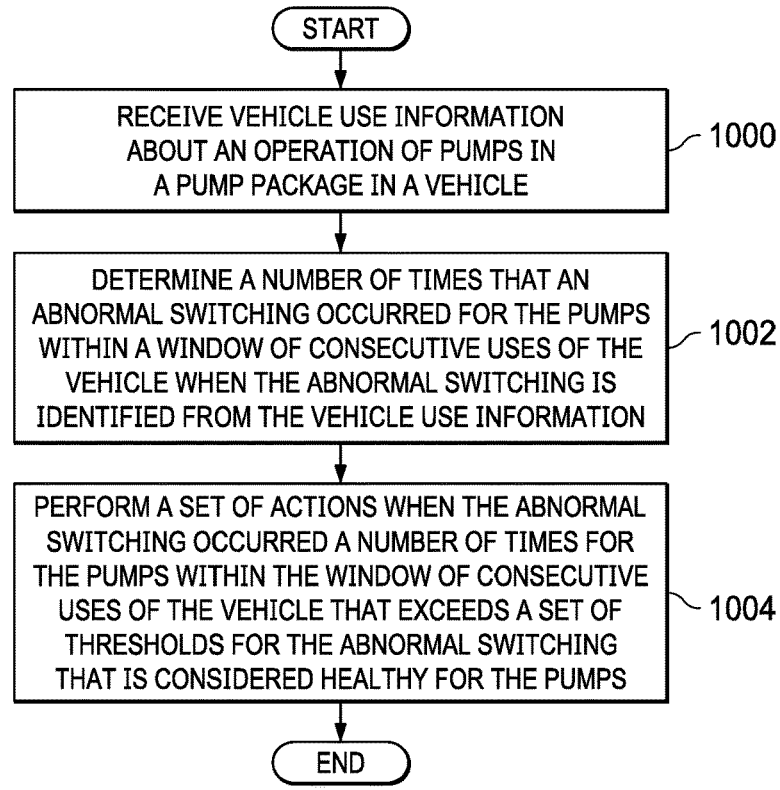
FIG. 10 is an illustration of a flowchart of a process for managing pumps in a vehicle in accordance with an illustrative embodiment.

Turning next to FIG. 10, an illustration of a flowchart of a process for managing pumps in a vehicle is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2.

The process begins by receiving vehicle use information about an operation of pumps in a pump package in a vehicle (operation 1000). The vehicle use information is received from the vehicle in operation 1000. The process determines a number of times that an abnormal switching occurred for the pumps within a window of consecutive uses of the vehicle when the abnormal switching is identified from the vehicle use information (operation 1002).

The process performs a set of actions when the abnormal switching occurred a number of times for the pumps within the window of consecutive uses of the vehicle that exceeds a set of thresholds for the abnormal switching that is considered healthy for the pumps (operation 1004). The process terminates thereafter.

Figure 11:
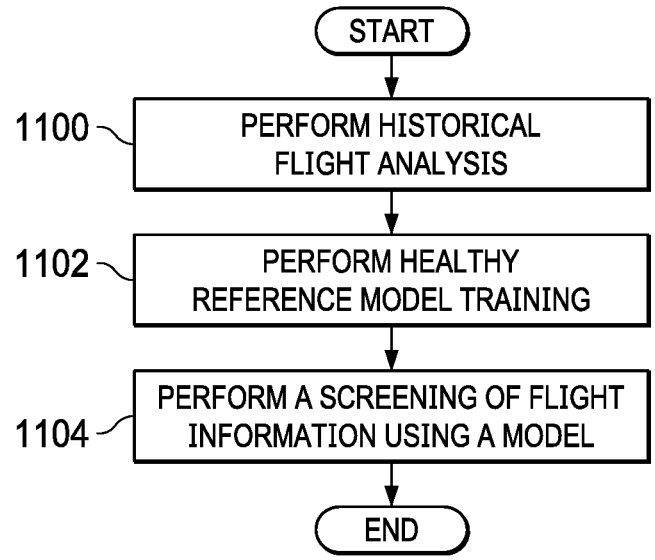
FIG. 11 is an illustration of a flowchart of a high-level process for creating a healthy reference model for managing pumps in an aircraft in accordance with an illustrative embodiment.

Turning next to FIG. 11, an illustration of a flowchart of a high-level process for managing pumps in an aircraft is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2.

The process begins by performing historical flight analysis (operation 1100). The historical flight analysis includes identifying switching events and, in particular, abnormal switching events and the types of abnormal switching events from historical flight information.

The process performs healthy reference model training (operation 1102). In operation 1102, a machine learning model in an artificial intelligence system can be trained to determine a background rate of abnormal switching events using the analysis of historical flight information. The background rate of abnormal switching events are abnormal switching events that occur at a rate in which a failure of pumps has not occurred. The training of a model takes into account that some current abnormal switching events occur without meaning that a pump has failed. The machine learning model is trained to identify situations in which an unusual number of or sequence of abnormal switching events has occurred that would lead to a conclusion that the pump is not operating correctly and requires maintenance. In this illustrative example, a pump failure includes a pump that is no longer working at a desired level of performance as well as a pump that does not function.

The process then performs a screening of flight information using the model (operation 1104). The process terminates thereafter. In operation 1104, the machine learning model in the artificial intelligence system can be used by a system controller to process flight information received from an aircraft. The machine learning model can be used to screen the flight information to determine whether to generate an alert or other action should be taken. Further, a significance level can be selected or configured by the machine learning model.

In this illustrative example, significance is a statistical confidence level. For example, if a threshold of 0.01 is used, an alert is generated when a 99% confidence level is present that the abnormal switching events do not match the healthy reference behavior. If a threshold of 0.05 is used, the switching manager generates an alert when a 95% confidence level is present that the abnormal switching events do not match healthy reference behavior. The 0.05 threshold is less stringent than the 0.01 threshold, meaning more alerts are expected and alerts are expected to be generated earlier in time with the threshold of 0.05.

In this illustrative example, this threshold for significance is configurable and set based on the customer tolerance of false positive alerts relative to true positive detection capability. By default, a threshold of 0.01 can be used.

Figure 12:
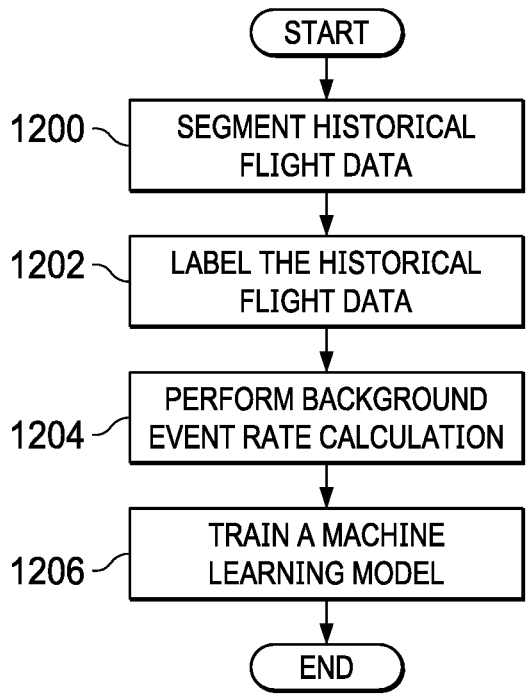
FIG. 12 is an illustration of a flowchart of a high-level process for training a machine learning model in artificial intelligence system to identify when abnormal switching events are greater than a background rate considered to be healthy for pumps in accordance with an illustrative embodiment.

Turning now to FIG. 12, an illustration of a flowchart of a high-level process for training a machine learning model in an artificial intelligence system to identify when abnormal switching events are greater than a background rate considered to be healthy for pumps is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in system manager 202 in computer system 204 in FIG. 2. This process can be used to train machine learning model in artificial intelligence system, such as artificial intelligence system 402 in FIG. 4.

The process begins by segmenting historical flight data (operation 1200). The historical flight data can be segmented based on when pumps were installed and removed in operation 1200. For example, a segment begins when a pump is installed or replaced. The segment ends when the pump is removed. The pump can be removed for maintenance or replacement by another pump.

The process labels the historical flight data (operation 1202). The label can identify segments or portions of segments when pump operation in the historical flight data is healthy. The identification of durations in which the pump is healthy can be determined from maintenance data indicating at least one of inspections, maintenance, replacements, pump failures, or other suitable maintenance data that can be used to determine when the pumps were operating as desired or when pumps have failed. In this illustrative example, a pump is considered to have failed if the pump no longer operates with a desired level performance even though the pump is still operational.

The process then performs background event rate calculation (operation 1204). In this operation, the process identifies abnormal switching events that are considered to be at a level where the pumps are operating as desired and have not failed. This calculation can be made based on identifying the number of abnormal switching events where the pumps were identified to be healthy when the pumps were removed for maintenance. Abnormal switching events can occur during routine operation of pumps even when the pumps are operating as desired. As a result, the occurrence of the abnormal switching event does not mean it failed.

The process then trains the machine learning model (operation 1206). The process terminates thereafter.

In operation 1206, the machine learning model in the artificial intelligence system is trained with a training set generated from inputs, such as inputs 401 depicted in FIG. 4. The training can be performed using at least one of portions of historical flight information that has been labeled as healthy or portions of historical flight information that are labeled as containing a pump failure. As a result, the machine learning model can output information for a healthy background rate database for use in processing flight information. In other illustrative examples, the machine learning model includes a healthy background rate database that can be for processing flight information.

Figure 13:
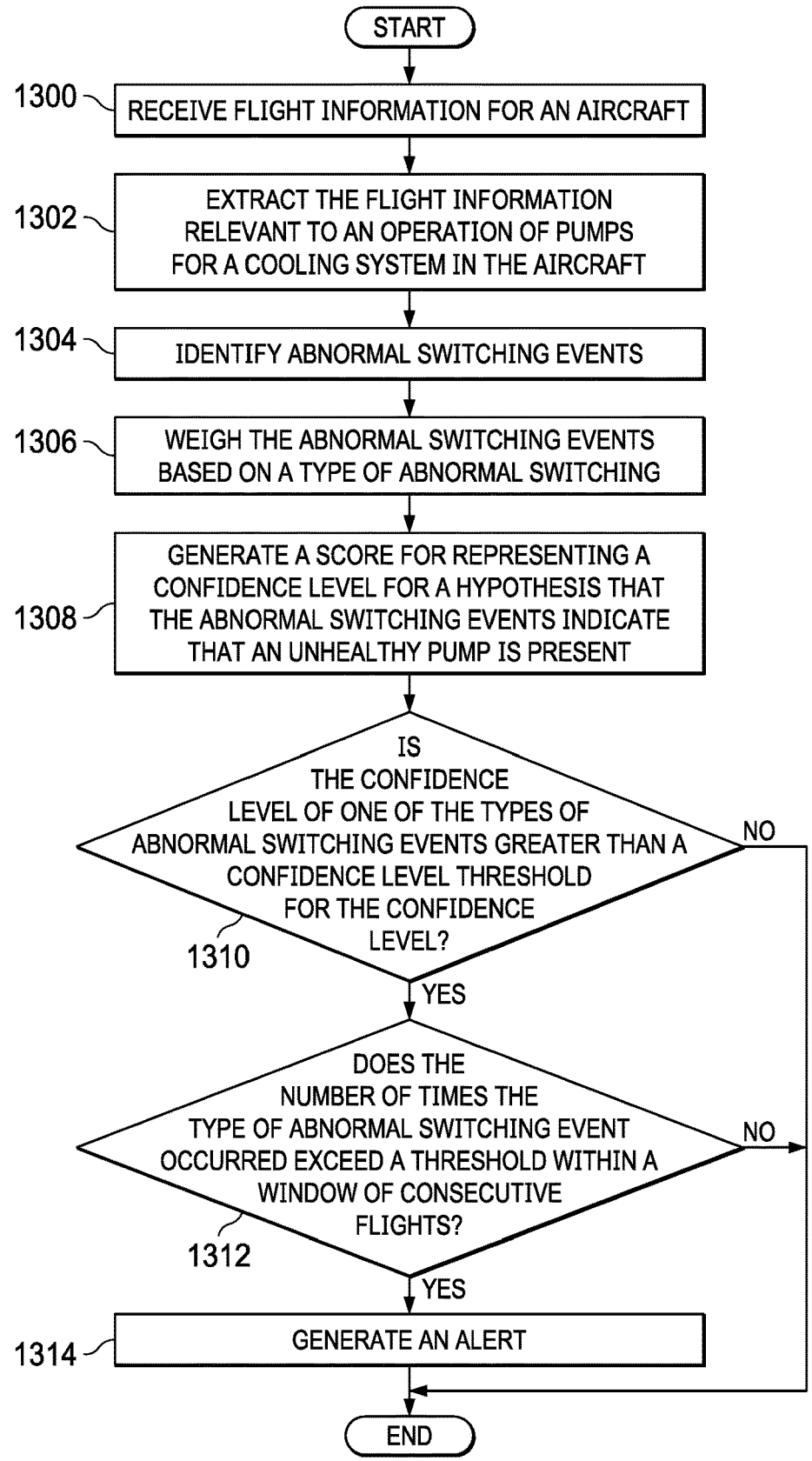
FIG. 13 is an illustration of a flowchart of a process for processing flight information in accordance with an illustrative embodiment.

Turning now to FIG. 13, an illustration of a flowchart of a process for processing flight information is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in system manager 202 in computer system 204 in FIG. 2.

The process begins by receiving flight information for an aircraft (operation 1300). The process extracts flight information relevant to an operation of pumps for a cooling system in the aircraft (operation 1302). In operation 1302, information such as pump speed, date and time, flight phase, and pump identifications can be extracted from the flight information used in identifying switching events.

The process then identifies abnormal switching events (operation 1304). In this illustrative example, the abnormal switching events are identified along with the types of abnormal switching events. The identification in operation 1304 includes identifying a pump and the number of abnormal switching events by type of abnormal switching event.

The process then weights the abnormal switching events based on the type of abnormal switching (operation 1306). In other words, operation 1306 can assign a weight to an abnormal switching event based on the type of abnormal switching event. The process in operation 1306 can apply a weighted sum of the abnormal switching events in a window of consecutive flights. Different switching events may be considered more severe and more important to generate an alert earlier than other switching events. These types of switching events can be assigned a higher weight as compared to other types of switching events. In As a result, the weight of an abnormal switching event can be adjusted based on the type of abnormal switching that is present.

In other words, different levels of importance can be assigned to different types of abnormal switching events using weights. For example, a single occurrence of a first type of abnormal switching event may be more indicative of a pump failure than a single occurrence of another type of abnormal switching event. As a result, a higher weight can be applied to the first type of switching event relative to the weights of other types of switching events.

This weighting can be determined using at least one of a healthy background rate database or a machine learning model in an artificial intelligence system that has been trained to recognize when abnormal switching rates are healthy or unhealthy with respect to pump failure. Further, this weighing can also be adjusted based on other factors such as at least one of a model type, the manufacturer, a generation, or other characteristics of the pump. For example, with a failed crossover flight switch event, a midflight switch event, and a combined event, the failed crossover flight switch event may be given a higher weight than the other two abnormal switching events.

The process generates a score representing a confidence level for the hypothesis that the abnormal switching indicates that an unhealthy pump is present (operation 1308). This score can be generated using a statistical test. One example of a statistical test is a binomial test.

In operation 1308, the process can perform a comparison between the observed recent abnormal switching behavior and the healthy reference behavior derived from historical flight data. This comparison can be made using at least one of healthy background rate database 420 in FIG. 4 or artificial intelligence system 402 in FIG. 4. The process in operation 1308 can include a comparison of the number of abnormal switching events for a particular type within a window of consecutive flights to background rate in a healthy background rate database.

A determination is made as to whether the score is greater than a threshold, the threshold represents the minimum required confidence level to generate the alert. (operation 1310). In operation 1310, if the threshold exceeded, then the process accepts the hypothesis that the observed recent abnormal switching behavior is associated with an unhealthy pump. For example, in operation 1310, a threshold representing a confidence level of 99% could be applied to this determination. If the score is not greater than the threshold, the process terminates.

Otherwise, the process determines whether the threshold has been exceeded for a minimum number of consecutive flights within a window of the most recent flights (operation 1312). In operation 1312, the process an counts the number of times that operation 1310 returns a yes result indicating that the threshold has been exceeded within a window of consecutive flights If this count exceeds the for a threshold number of flights, the process generates an alert (operation 1314). For example, in determining whether to generate an alert, the process in operation 1312 may determine that the confidence level threshold evaluated in operation 1310 has been exceeded more than three times within the last ten flights of an aircraft. Operation 1312 can be used to ensure that an abnormal condition is persistent before generating an alert, which helps avoid generating false positive alerts. In this manner, false alerts may be reduced.

With reference again to operation 1312, if the number of times that a threshold has been exceeded not meet a minimum number of consecutive flights within a window of the most recent flights, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
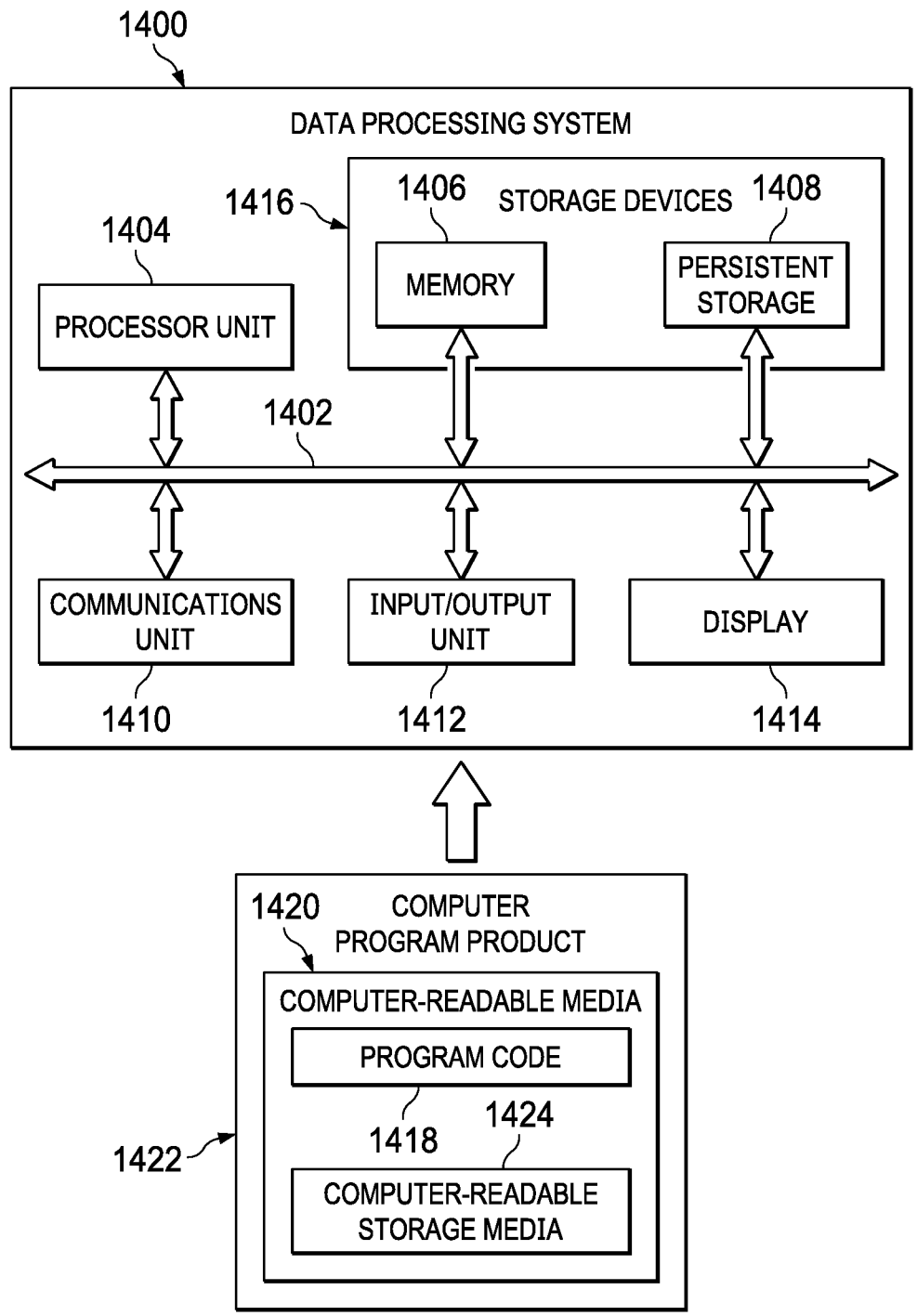
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 can be used to implement computer system 204 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 can take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 can provide a connection for user input through at least one of a keyboard, a mouse, or some other suitable input device. Further, input/output unit 1412 can send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which can be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage medial 424.

In these illustrative examples, computer-readable storage media 1424 is a physical or tangible storage device used to store program code 1418 rather than a medium that propagates or transmits program code 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program code 1418 can be located in computer-readable media 1420 in the form of a single storage device or system. In another example, program code 1418 can be located in computer-readable media 1420 that is distributed in multiple data processing systems. In other words, some instructions in program code 1418 can be located in one data processing system while other instructions in program code 1418 can be located in one data processing system. For example, a portion of program code 1418 can be located in computer-readable media 1420 in a server computer while another portion of program code 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, can be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Figure 15:
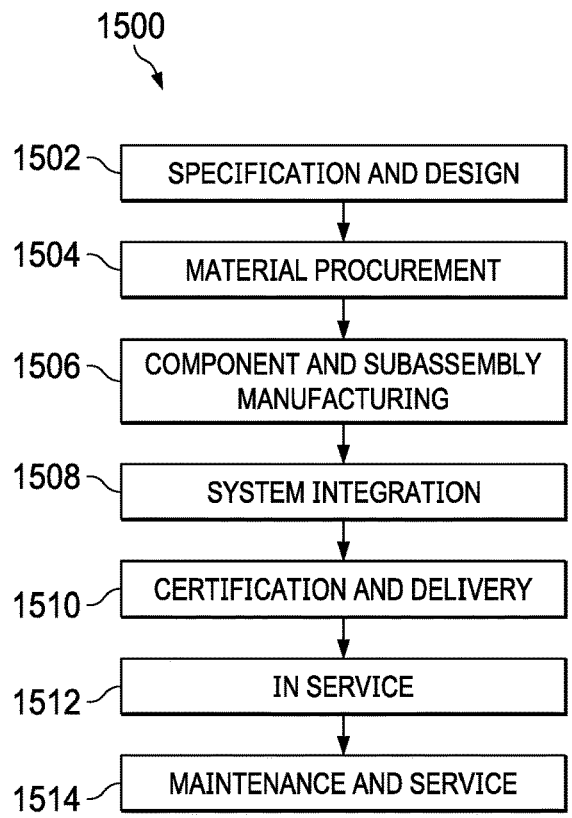
FIG. 15 is an illustration of an aircraft manufacturing and service method in accordance with an illustrative embodiment.
Figure 16:
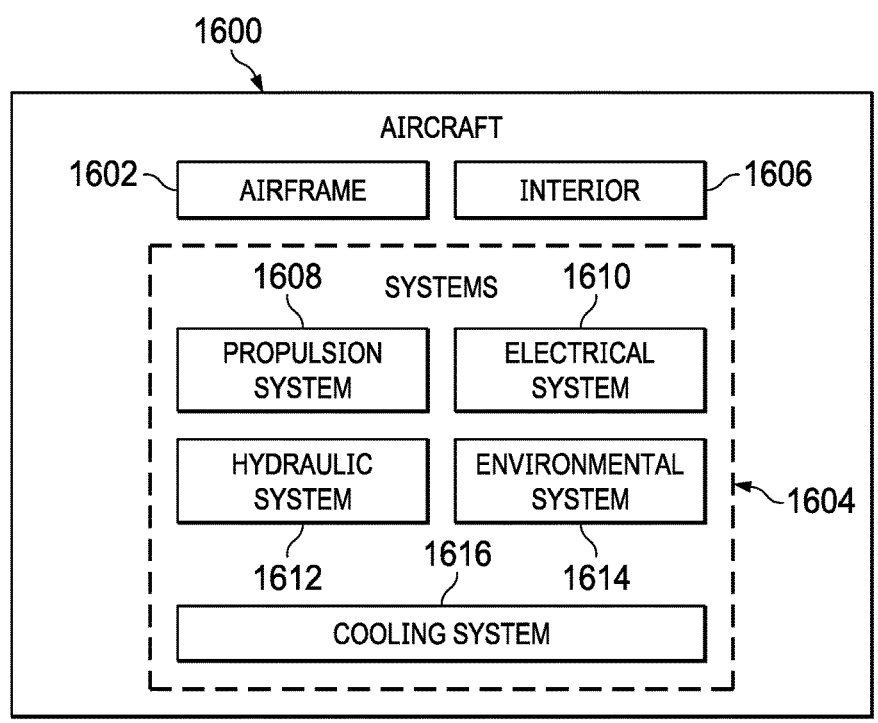
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During preproduction, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 can go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, environmental system 1614, and cooling system 1616. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 can be fabricated or manufactured in a manner similar to components or subassemblies produced while aircraft 1600 is in service 1512 in FIG. 15. As yet another example, one or more apparatus embodiments, method embodiments, or a combination thereof can be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of aircraft 1600, reduce the cost of aircraft 1600, or both expedite the assembly of aircraft 1600 and reduce the cost of aircraft 1600.

For example, system manager 202 can be used to predict when maintenance and service 1514 will be needed for cooling system 1616 in aircraft 1600. The use of system manager 202 in FIG. 2 can be used to reduce maintenance costs in maintenance and service 1514, increased availability of aircraft 1600 for in service 1512, or some combination thereof.

Thus, the illustrative embodiments provide a method, apparatus, system, and computer program product for managing pumps in an aircraft. Flight information about an operation of the pumps in a pump package in the aircraft is received by a computer system. The flight information is received from the aircraft. A number of times that an abnormal switching occurred for the pumps within a window of consecutive flights is determined by the computer system when the abnormal switching is identified from the flight information. A set of actions is performed by the computer system when the abnormal switching occurred a number of times for the pumps within the window of consecutive flights that exceeds a set of thresholds for the abnormal switching that is considered healthy for the pumps.

One or more illustrative examples enable at least one of scheduling maintenance or performing maintenance on pumps in a cooling system with sufficient lead time such that at least one of a reduced maintenance cost, a reduced repair cost, and an increased availability of aircraft occurs. As a result, the illustrative examples can reduce costs for operating aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing pumps in an aircraft, the method comprises:

receiving, by a computer system, flight information including information about an operation of the pumps in a pump package in the aircraft, wherein the flight information is received from an aircraft condition monitoring system (ACMS) within the aircraft and coupled with the pump package, wherein the flight information is received via a network interface between the ACMS and the computer system;

analyzing, by a system manager in the computer system, the flight information including the information about operation of pumps in the pump package in the aircraft;

determining, from analysis of the flight information by the system manager in the computer system, a number of times that an abnormal switching occurred for the pumps within a window of consecutive flights when the abnormal switching is identified from the flight information, wherein an abnormal switching occurs when at least one expected switch between the pumps between consecutive flights fails to occur; and performing, by the computer system, a set of actions when the abnormal switching occurred the number of times for the pumps within the window of consecutive flights that exceeds a set of thresholds for the abnormal switching that is considered healthy for the pumps.

2. The method of claim 1, wherein determining comprises:

determining, by the computer system, the number of times that any of a set of types of abnormal switching events occurred for the pumps within the window of consecutive flights when the abnormal switching is identified from the flight information.

3. The method of claim 2, wherein the set of types of abnormal switching events further comprises an occurrence of at least one of: a switch between the pumps during a flight of the aircraft; or the switch between the pumps during the flight of the aircraft and a failure to switch the pumps after the flight.

4. The method of claim 1, further comprising:

identifying, by the computer system, the abnormal switching occurring when the pumps were healthy in historical flight information from aircraft flights; and selecting, by the computer system, the set of thresholds for the abnormal switching that is considered healthy for the pumps based on the abnormal switching occurring when the pumps were healthy in historical flight information from the aircraft flights.

5. The method of claim 4, wherein identifying, by the computer system, the abnormal switching occurring when the pumps were healthy in the historical flight information from the aircraft flights comprises:

identifying, by the computer system, a healthy rate of abnormal switching occurred when the pumps were healthy in the historical flight information from the aircraft flights.

6. The method of claim 4, wherein selecting, by the computer system, the set of thresholds for the abnormal switching that is considered healthy for the pumps based on the abnormal switching occurring when the pumps were healthy in the historical flight information from the aircraft flights comprises:

selecting, by the computer system, the set of thresholds for the abnormal switching that is considered healthy for the pumps based on the abnormal switching occurring when the pumps were healthy in the historical flight information from the aircraft flights, wherein the set of thresholds for the abnormal switching provides a lead time to perform maintenance before a pump fails.

7. The method of claim 1, further comprising:

training, by the computer system, an artificial intelligence system to identify the set of thresholds for the abnormal switching considered healthy for the pumps using historical flight information which the abnormal switching occurred when the pumps were healthy; and determining, by the artificial intelligence system, when the abnormal switching occurred the number of times for the pumps in the window of consecutive flights that exceeds the set of thresholds for the abnormal switching that is considered healthy from the flight information.

8. The method of claim 1, wherein the set of actions comprises at least one of generating an alert, sending a message, or scheduling maintenance.

9. The method of claim 1, wherein the flight information is received at a time selected from at least one of after a flight of aircraft or during the flight of the aircraft.

10. The method of claim 1, wherein the flight information is airplane condition monitoring system data.

11. The method of claim 1, further comprises:

determining the abnormal switching for the pumps based on a speed of the pumps in the flight information received from the aircraft.

12. A pump management system comprising:

a computer system; and a system manager in the computer system, wherein the system manager operates to:

receive flight information including information about an operation of pumps in a pump package in an aircraft, wherein the flight information is received from from an aircraft condition monitoring system (ACMS) within the aircraft and coupled with the pump package, wherein the flight information is received via a network interface between the ACMS and the computer system;

analyze the flight information including the information about the operation of pumps in the pump package in the aircraft;

determine, based on analysis of the flight information, a number of times that an abnormal switching occurred for the pumps within a window of consecutive flights when the abnormal switching is identified from the flight information, wherein an abnormal switching occurs when at least one expected switch between the pumps between consecutive flights fails to occur; and perform a set of actions when the abnormal switching occurred the number of times for the pumps within the window of consecutive flights that exceeds a set of thresholds for the abnormal switching that is considered healthy for the pumps.

13. The pump management system of claim 12, wherein in determining the number of times that the abnormal switching occurred for the pumps within the window of consecutive flights when the abnormal switching is identified from the flight information, the system manager operates to:

determine the number of times that any of a set of types of abnormal switching events occurred for the pumps within the window of consecutive flights when the abnormal switching is identified from the flight information.

14. The pump management system of claim 13, wherein the set of types of abnormal switching events further comprises an occurrence of at least one of: a switch between the pumps during the flight of the aircraft; or the switch between the pumps during the flight of the aircraft and a failure to switch the pumps after the flight.

15. The pump management system of claim 12, wherein the system manager operates to:

identify the abnormal switching occurring when the pumps were healthy in historical flight information from aircraft flights; and select the set of thresholds for the abnormal switching that is considered healthy for the pumps based on the abnormal switching occurring when the pumps were healthy in the historical flight information from the aircraft flights.

16. The pump management system of claim 15, wherein in identifying the abnormal switching occurring when the pumps were healthy in the historical flight information from the aircraft flights, the system manager operates to:
identify a healthy background rate of abnormal switching in which the abnormal switching occurred when the pumps were healthy in the historical flight information from the aircraft flights.

17. The pump management system of claim 15, in selecting, by the computer system, the set of thresholds for the abnormal switching that is considered healthy for the pumps based on the abnormal switching occurring when the pumps were healthy in the historical flight information from the aircraft flights, the system manager operates to:
select, by the computer system, the set of thresholds for the abnormal switching that is considered healthy for the pumps based on the abnormal switching occurring when the pumps were healthy in the historical flight information from the aircraft flights, wherein the set of thresholds for the abnormal switching provides a lead time to perform maintenance before a pump fails.

18. The pump management system of claim 12, wherein the system manager operates to:
train an artificial intelligence system to identify the set of thresholds for the abnormal switching considered healthy for the pumps using historical flight information in which the abnormal switching occurred when the pumps were healthy; and
determine when the abnormal switching occurred the number of times for the pumps in the window of consecutive flights that exceeds the set of thresholds for the abnormal switching that is considered healthy from the flight information using the artificial intelligence system.

19. The pump management system of claim 12, wherein the set of actions comprises at least one of generating an alert, sending a message, or scheduling maintenance.

20. The pump management system of claim 12, wherein the flight information is received at a time selected from at least one of after a flight of aircraft or during the flight of the aircraft.

21. The pump management system of claim 12, wherein the flight information is airplane condition monitoring system data.

22. The pump management system of claim 12, wherein the system manager operates to:
determine the abnormal switching for the pumps based on a speed of the pumps in the flight information received from the aircraft.

23. A pump management system comprising:
a computer system; and
a system manager in the computer system, wherein the system manager operates to:
receive vehicle use information including information about an operation of pumps in a pump package in a vehicle, wherein the vehicle use information is received from a monitoring system within the vehicle and coupled with the pump package, wherein the vehicle use information is received via a network interface between the monitoring system and the computer system;
analyze the vehicle use information including the information about the operation of pumps in the pump package in the vehicle;
determine, based on analysis of the vehicle use information, a number of times that an abnormal switching occurred for the pumps within a window of consecutive uses of the vehicle when the abnormal switching is identified from the vehicle use information, wherein an abnormal switching occurs when at least one expected switch between the pumps between consecutive flights fails to occur; and
perform a set of actions when the abnormal switching occurred the number of times for the pumps within the window of consecutive uses of the vehicle that exceeds a set of thresholds for the abnormal switching that is considered healthy for the pumps.

24. The pump management system of claim 23, wherein in determining the number of times that the abnormal switching occurred for the pumps within the window of consecutive uses of the vehicle when the abnormal switching is identified from the vehicle use information, the system manager operates to:
determine the number of times that any of a set of types of abnormal switching events occurred for the pumps within the window of consecutive uses of the vehicle when the abnormal switching is identified from the vehicle use information.

25. The pump management system of claim 24, wherein the set of types of abnormal switching events further comprises an occurrence of at least one of: a switch between the pumps during a use of the vehicle; or the switch between the pumps during the use of the vehicle and a failure to switch the pumps after the use of the vehicle.

26. The pump management system of claim 23, wherein the system manager operates to:
identify the abnormal switching occurring when the pumps were healthy in historical vehicle use information from uses of the vehicle; and
select the set of thresholds for the abnormal switching that is considered healthy for the pumps based on the abnormal switching occurring when the pumps were healthy in the historical vehicle use information from uses of the vehicle.

27. The pump management system of claim 23, wherein the vehicle is selected from a group comprising an aircraft, a surface ship, a cargo ship, a submarine, a tank, a personnel carrier, a train, a spacecraft, and a bus.

* * * * *